United States Patent [19]

Ortloff

[11] 4,402,533

[45] Sep. 6, 1983

[54] CLAMPING MECHANISM FOR CONNECTING MEMBERS IN END-TO-END RELATION

[75] Inventor: John E. Ortloff, Houston, Tex.

[73] Assignee: Exxon Production Rsearch Co., Houston, Tex.

[21] Appl. No.: 258,204

[22] Filed: Apr. 27, 1981

[51] Int. Cl.³ ............................................. F16L 37/10
[52] U.S. Cl. ..................................... 285/18; 285/314; 285/320; 285/DIG. 13; 285/DIG. 21
[58] Field of Search ............... 285/DIG. 13, DIG. 21, 285/18, 308, 320, 314, 315

[56] References Cited

U.S. PATENT DOCUMENTS

| | | |
|---|---|---|
| 1,046,328 | 12/1912 | Preuss . |
| 1,861,635 | 6/1932 | Lefkowitz . |
| 2,470,256 | 5/1949 | McElroy . |
| 2,645,506 | 7/1953 | Strugis . |
| 3,026,128 | 3/1962 | Willis . |
| 3,321,217 | 5/1967 | Ahlstone ..................... 285/315 X |
| 3,430,647 | 3/1969 | Wellstein . |
| 3,608,932 | 9/1971 | Brown ................................... 285/18 |
| 3,870,345 | 3/1975 | Liautaud . |
| 4,040,650 | 8/1977 | Shotbolt ..................... 85/DIG. 13 |
| 4,114,928 | 9/1978 | Lochte . |
| 4,124,361 | 11/1978 | Revell . |
| 4,195,865 | 4/1980 | Martin ................................. 285/311 |
| 4,232,890 | 11/1980 | Hoen . |
| 4,335,904 | 6/1982 | Saliger et al. ............. 285/DIG. 21 |

FOREIGN PATENT DOCUMENTS

| | | | |
|---|---|---|---|
| 669497 | 8/1963 | Canada ...................... 285/DIG. 13 |
| 2313624 | 12/1976 | France ................................ 285/320 |

Primary Examiner—Dave W. Arola
Attorney, Agent, or Firm—Marc L. Delflache

[57] ABSTRACT

A clamping mechanism for connecting members in end-to-end relation having a rotatable, actuating ring to radially move loading devices into engagement with one of the members. The translation of rotational movement to radial movement is accomplished by cam mechanisms. The loading devices may be toggle links of a toggle assembly which are supported by one of the members to be connected. Rotation of the actuating ring advances the locking device into engagement which in turn connects and preloads the members.

6 Claims, 6 Drawing Figures

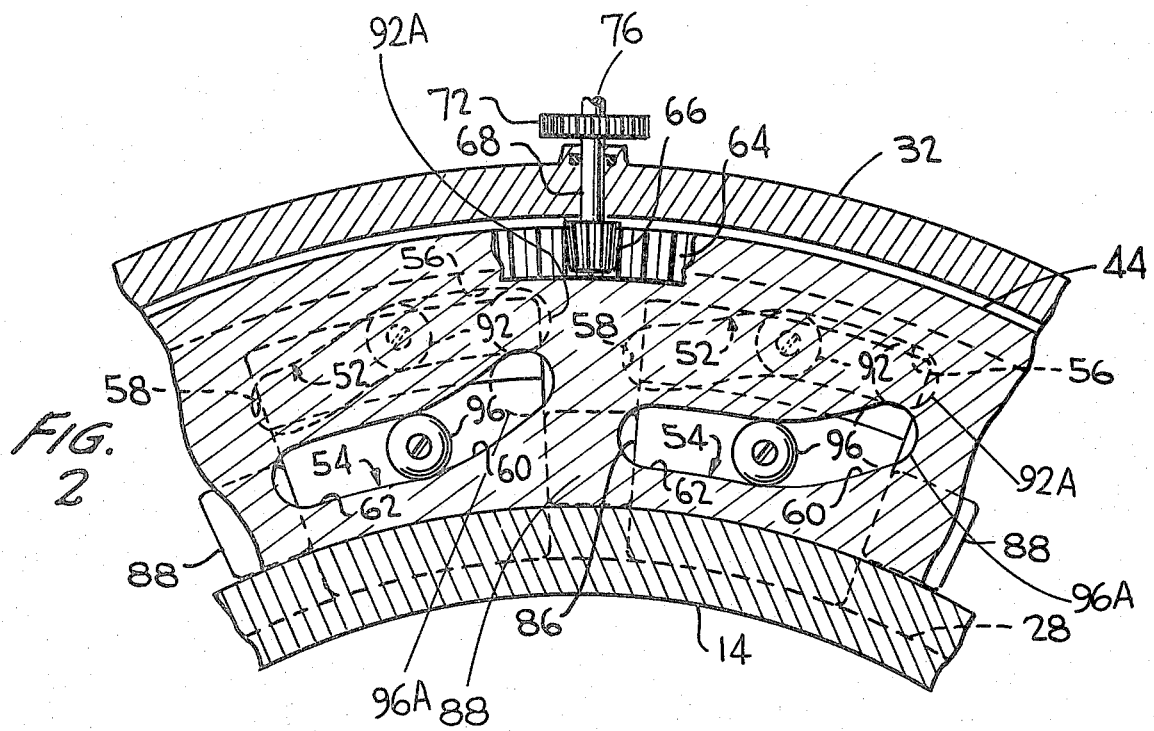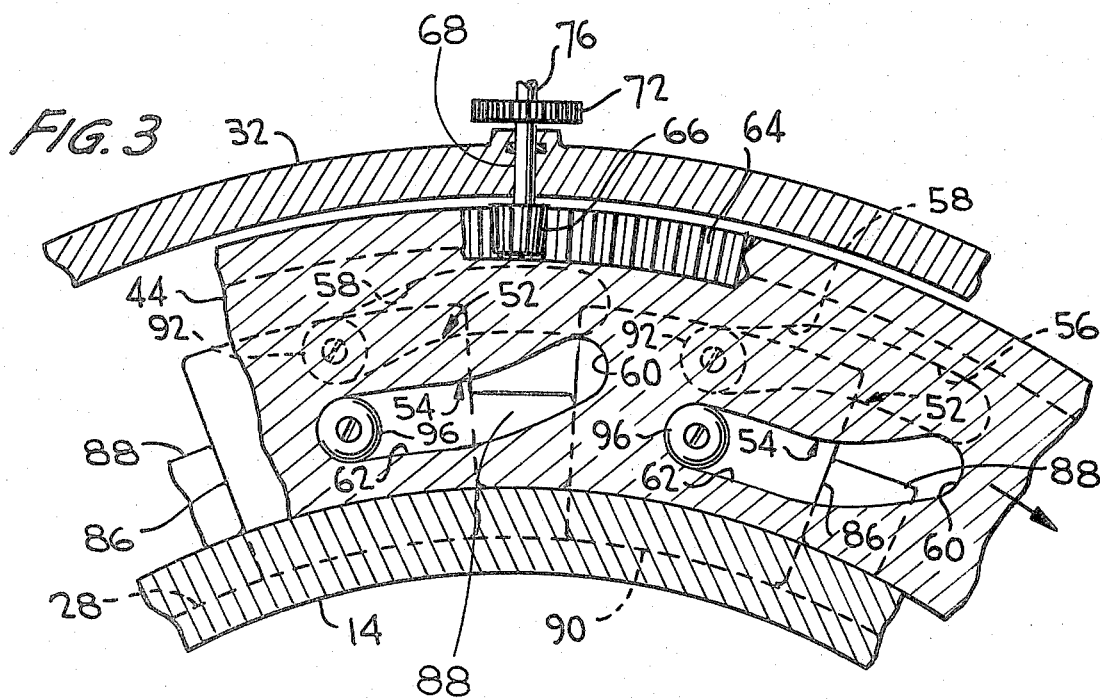

CLAMPING MECHANISM FOR CONNECTING MEMBERS IN END-TO-END RELATION

TECHNICAL FIELD

The present invention pertains to clamping mechanisms for connecting members in end-to-end relation and, more particularly, to such clamping mechanisms utilizing rotational movement to radially move loading devices into engagement with one of the members for high preload connection thereof.

BACKGROUND ART

Remotely operated clamping mechanisms for connecting and preloading members in end-to-end relation normally use hydraulically actuated annular piston arrangements or arrangements of a series of pistons to actuate the loading devices for tightening and preloading. For example, U.S. Pat. No. 4,114,928 discloses the use of manually actuated screws and hydraulic-operated pistons to control locking and toggle members. While hydraulic piston-operated clamping mechanisms have been generally accepted for connecting members there are disadvantages associated when such clamping mechanisms are used for connecting fluid conducting or drilling members for wells. For example, the members can become loose or actually disengage with the failure of hydraulic pressure. Moreover, hydraulic pistons held under pressure for extended periods of time are sometimes difficult to disengage so as to release the members; therefore, emergency mechanical backup systems, which are difficult to operate, are required to break apart the members.

Another type of prior art connection uses a cam means to engage a gripping surface with the end flange(s) of a pipe(s), as exemplified by U.S. Pat. Nos. 2,645,506 and 3,026,128. However, a problem with these designs is that the cam actuation is not capable of providing either horizontal or vertical movement to radially advance a toggle assembly. In addition, the existing designs fail to disclose a toggle assembly which is capable of locking in two members to permit a high make-up force.

Disclosure of Invention

The present invention is capable of overcoming the above-mentioned disadvantages of the prior art by providing a clamping mechanism which operates a loading device to tighten and preload members in end-to-end relation. This is accomplished by translating rotary movement of an actuator to radial movement of the loading device through either direct horizontal movement of the loading device or indirect horizontal movement of the loading device via a vertically displaced lifting means.

The present invention is capable of connecting members in end-to-end relation without requiring the use of hydraulic pistons. Moreover, the present invention includes a housing sealably engaging the connected members with passages therein for supplying and venting a corrosion inhibiting solution.

Some of the advantages of the present invention over the prior art are that the clamping mechanism can be operated by a small electric or hydraulic motor. In addition, the clamping mechanism can be simply provided with self-locking features to prevent release during operation, and flushing and filling of the clamping mechanism with oil or a corrosion inhibiting solution is facilitated.

Other objects and advantages of the present invention will become apparent from the following description of the preferred embodiment taken in conjunction with the accompanying drawings.

BRIEF DESCRIPTION OF THE DRAWINGS

FIG. 2 is a section taken along line 2—2 of FIG. 1.

FIG. 3 is a section similar to that of FIG. 2 showing the clamping mechanism in a clamped position.

BEST METHOD FOR CARRYING OUT THE INVENTION

Preferred Embodiment

Figure 1:
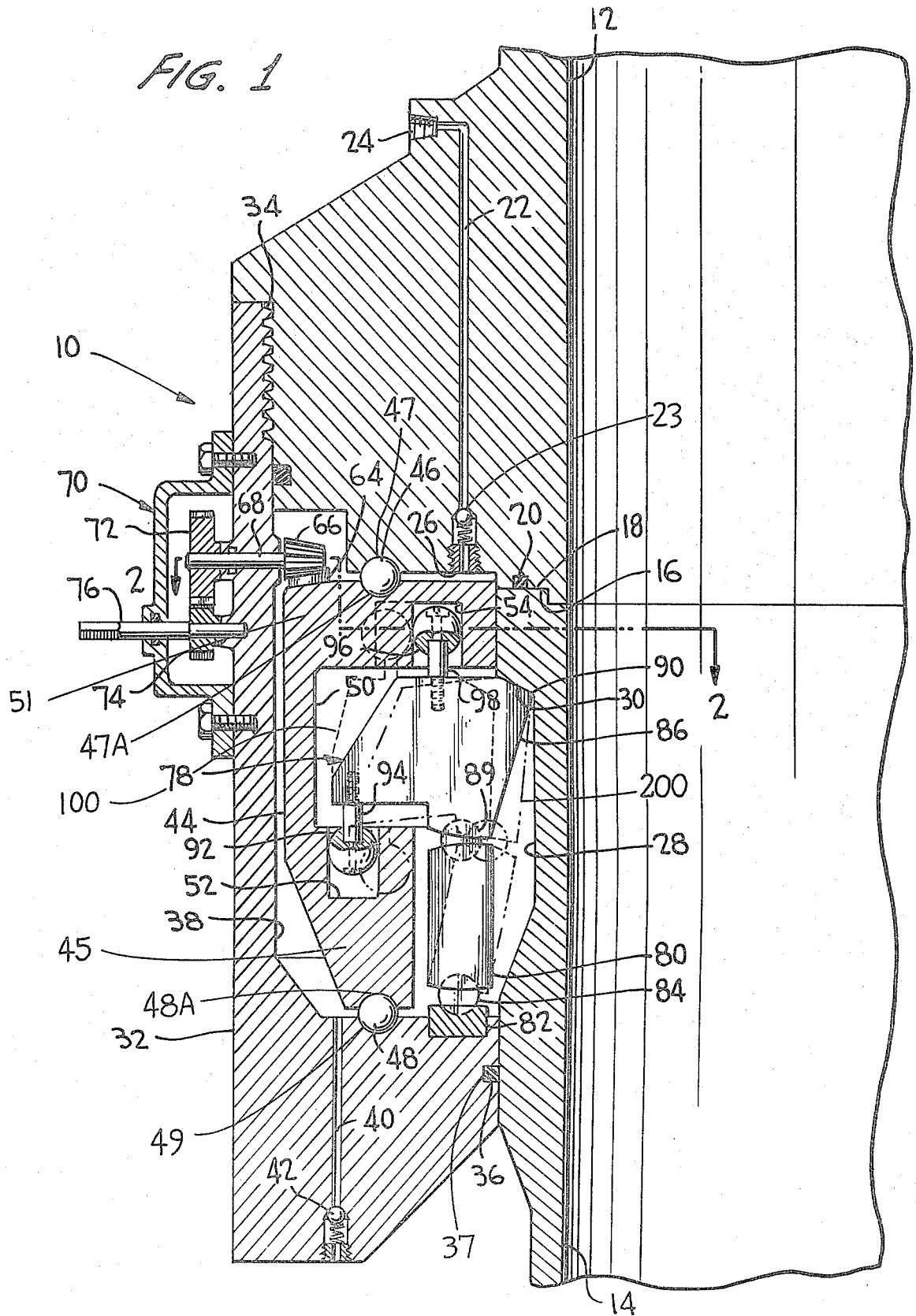
FIG. 1 is a vertical section of a clamping mechanism according to a preferred embodiment of the present invention.

A clamping mechanism 10 according to the preferred embodiment of the present invention is shown in FIG. 1. The clamping mechanism is used to connect an upper member 12, such as an active connector assembly, with a lower member 14, such as a passive connector assembly. While the clamping mechanism 10 will be described hereinafter for use in connecting fluid conducting and drilling members for oil or gas wells, the clamping mechanism could be used to connect any pair of members having mating ends fitting one within the other.

The upper member 12 has an annular shoulder 16 capable of engaging a mating, annular, load-carrying shoulder 18 of the lower member 14. An annular seal 20 is carried therebetween in a recess within shoulder 16. A passage 22 extends through upper member 12 from a threaded port 24 to a port 26 adjacent the clamping mechanism 10. Passage 22 is provided with a check valve 23 to prevent leakage of fluid from the clamping mechanism. The passage 22 is used to supply oil or a corrosion inhibiting solution to the clamping mechanism.

The lower member 14 has a recess 28 therearound. The recess includes a load receiving upper shoulder 30. The clamping mechanism includes a housing 32 which is threadedly mounted on upper member 12 with threads 34. The housing engages the lower member 14 below the recess 28. A seal 36 is carried in a recess 37 within the housing 32 to engage the lower member. The housing 32 extends annularly around the upper and lower members to define an annular chamber 38. Pressure within the chamber 38 is controlled via a passage 40 and a pressure relief valve 42.

An actuating ring 44 is supported in chamber 38 between an upper row of ball bearings 46 and a lower row of ball bearings 48. Bearings 46 are seated in a raceway 47 in the upper member 12 and a raceway 47A in the top surface of actuating ring 44. Bearings 48 are seated in a raceway 49 in housing 32 and a raceway 48A in the lower surface of actuating ring 44. The ball bearings provide support and stability for the actuating ring and ensure minimum friction and resistance to rotation. The actuating ring 44 includes a bottom wall 45, having a plurality of spaced loading cam grooves 52 therein, and a top wall 51 having a plurality of spaced positioning cam grooves 54 therein. The bottom and top walls define an opening 50.

Referring to FIG. 2, the loading cam grooves 52 have portions 56 extending in concentric alignment with the actuating ring 44 and portions 58 extending inwardly from the center, toward the lower member 14. The positioning cam grooves 54 have portions 60 extending outwardly from the center, away from the lower member 14, and portions 62 in concentric alignment with the actuating ring 44. The actuating ring 44 has a toothed ridge or rack 64 meshing with a bevelled pinion 66. The pinion 66 is mounted on a rotating shaft 68 which extends through bearings in housing 32 to a gear reduction unit 70 bolted to housing 32 (see FIG. 1) The gear reduction unit 70, which is sealed and filled with a lubricant, provides speed reduction and increased torque. The unit 70 includes a driven gear 72 secured to shaft 68 and a driving gear 74 meshing with gear 72 and secured to a drive shaft 76. The shaft 76 has a square end adapted to be rotatably driven by an hydraulic or electric motor (not shown).

A toggle assembly 78 is mounted within actuating ring 44 around the circumference of the lower member 14. The toggle assembly includes a plurality of spaced lower toggle links 80 pivotally supported on bearing blocks 82 via pivot pins 84 and separated by spacers 88 (see FIGS. 2 and 3). The bearing blocks are supported on the housing 32.

The toggle assembly further includes a plurality of upper toggle links 86 pivotally mounted on lower links 80 via central pivot pins 89. Pivot pins 89 are entrapped between toggle links 80 and 86 so as to prevent lateral movement therebetween. Similarly, pivot pins 84 may be entrapped between lower toggle links 80 and bearing blocks 32 to prevent lateral movement therebetween. The upper links 86 are arranged within the opening 50 of actuating ring 44. A loading cam follower 92, which is in the form of a ball and rotatably mounted on a pin 94 depending from the bottom of the upper link 86, rides in one of the loading cam grooves 52. A positioning cam follower 96, which is also in the form of a ball and rotatably mounted on a pin 98 extending upward from the top of the upper link 86, rides in one of the positioning cam grooves 54. The number of lower and upper links 80 and 86 in a particular toggle assembly 78 depends on the preloading requirements for connecting the upper and lower members. Each upper link 86 includes a load surface 90 which will engage the load receiving shoulder 30 of lower member 14.

In operation, the positioning cam followers 96 and the positioning cam grooves 54 control the positioning of the load surfaces 90 relative to the recess 28. The toggle assembly is fully retracted (as illustrated by phantom lines 100 in FIG. 1) when the positioning cam followers 96 are at the end of portions 60 of the positioning cam grooves 54 and the cam followers 92 are at the end of portions 56 of the loading cam grooves 52 (the location of cam followers 92 and 96 in this fully retracted position are shown by phantom lines 92A and 96A in FIG. 2). With the upper links 86 fully retracted within opening 50, the lower member 14 may be easily withdrawn from the housing 32. To place the toggle assembly in this fully retracted position, the actuating ring 44 is rotated counterclockwise (looking at FIGS. 2 and 3) via the drive through the gear reduction unit 70/pinion 66/rack 64.

To engage upper member 12 and lower member 14, the toggle assembly is retracted, as discussed above, and the upper and lower members are then arranged in a mating position as shown in FIG. 1. The actuating ring 44 is then rotated in a clockwise direction (looking at FIGS. 2 and 3) via the gear reduction unit 70. Clockwise rotation of the actuating ring causes (i) cam followers 92 to move along cam groove portions 56 toward portions 58 and (ii) cam followers 96 to move along cam groove portions 60 toward portions 62. Movement of the actuating ring 44 until the cam followers are centrally position :d in the cam grooves (as shown by lines 92 and 96 in FIG. 2) serves only to pivot upper link 86 forward into the recess 28 around lower member 14 because the cam followers 92 are not radially displaced. Thus, the pivot pins 89 are not moved inwardly toward the lower member. Accordingly, the load surface 90 will be positioned in either abutting or closely adjacent relation to load receiving shoulder 30 (the toggle assembly is shown in this position in FIG. 2 with solid lines).

Further clockwise rotation of the actuating ring 44 advances the cam followers 92 and 96 to the end of portions 58 and 62, respectively, where cam followers 96 are maintained a constant distance from the lower member 14 but cam followers 92 are moved radially inward to move pivot pins 89 toward the recess 28 and force load surfaces 90 inwardly and upwardly into engagement with load receiving shoulder 30 (as shown by phantom lines 200 in FIG. 1). In this position, the upper and lower links are slightly kinked or over centered, thereby locking the toggle assembly in place.

To release the upper and lower members, the actuating ring 44 is rotated in a counterclockwise direction and the toggle assembly 78 is returned to the fully retracted position, as discussed above.

The toggle assembly as illustrated in the preferred embodiment is illustrative. It is understood that one skilled in the art can, in view of this disclosure, use various other types of locking devices, such as collets, gripping dogs and the like in combination with the cam and cam follower, rotating and radial motion actuating mechanism disclosed herein.

Alternate Embodiment

Figure 4:
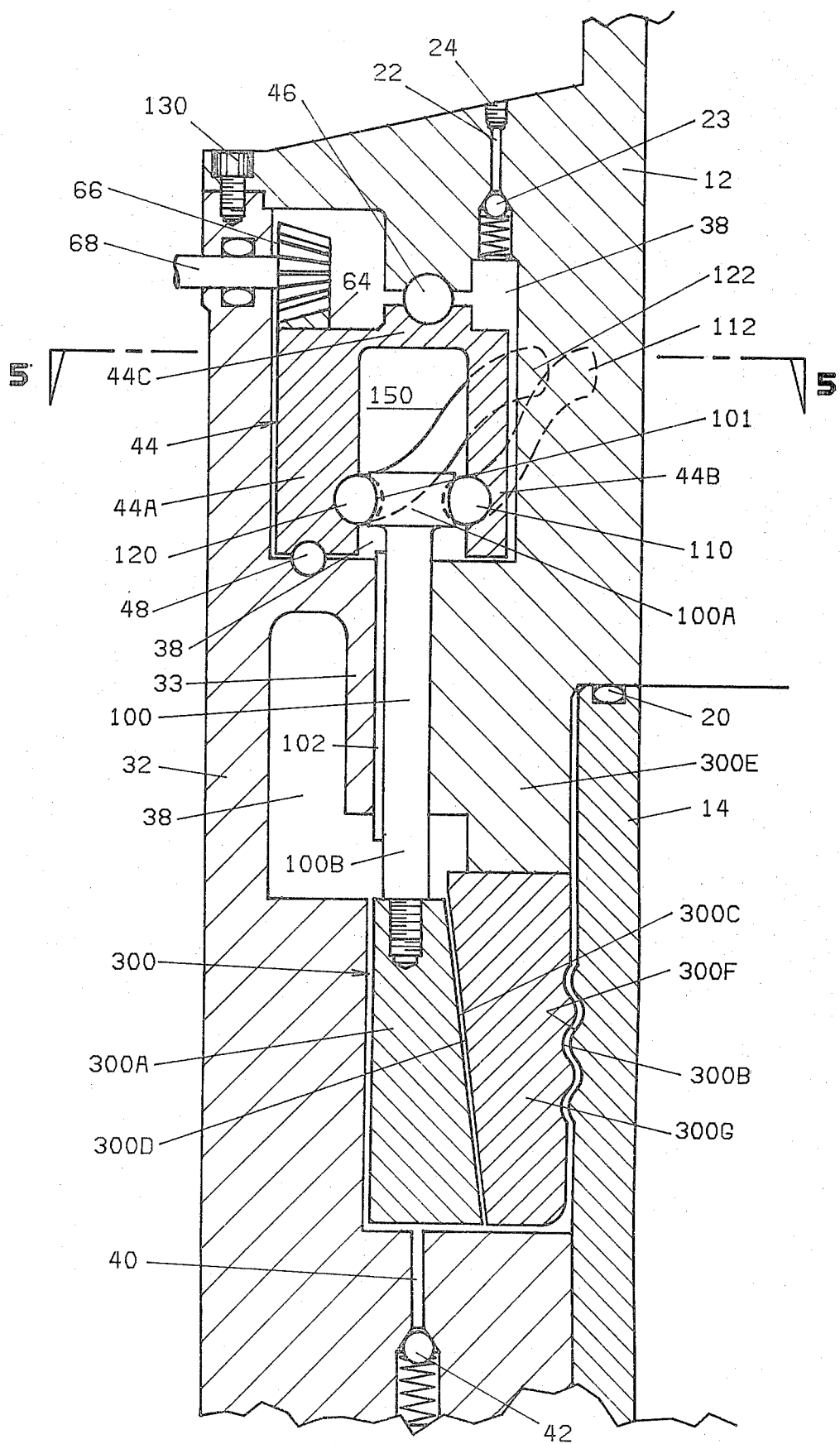
FIG. 4 is a vertical section of a clamping mechanism according to an alternate embodiment of the present invention.
Figure 5:
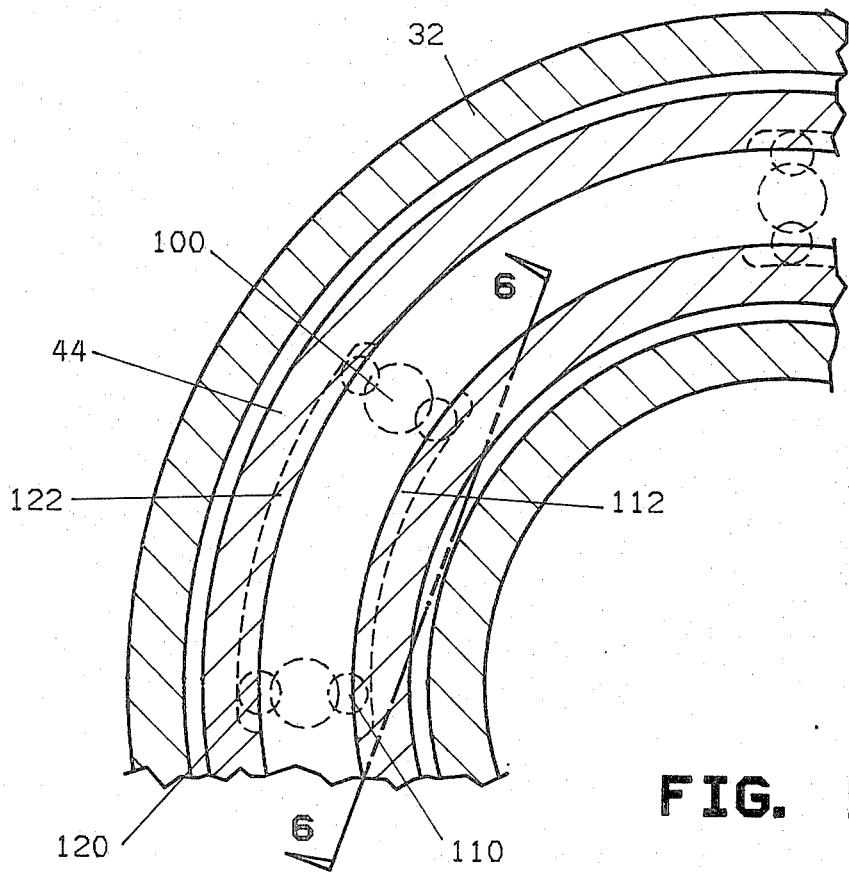
FIG. 5 is a section taken along line 5—5 of FIG. 4.
Figure 6:
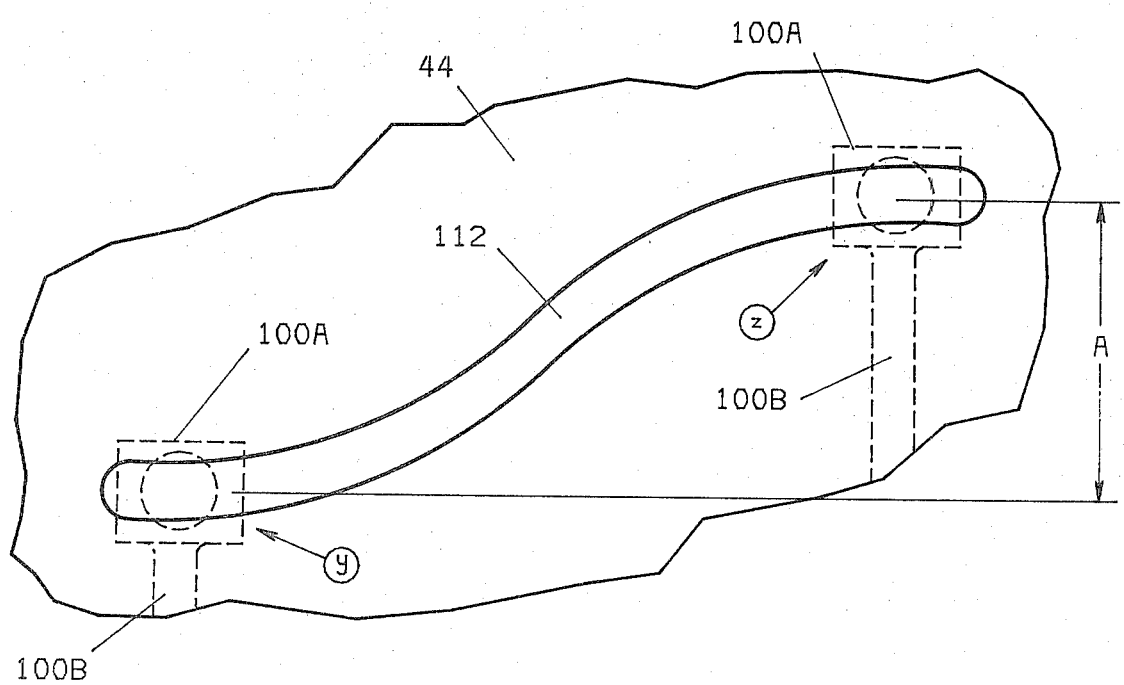
FIG. 6 is a section taken along line 6—6 of FIG. 5.

An alternate embodiment of the present invention is illustrated in FIGS. 4-6. In this embodiment, horizontal movement of a locking device assembly 300 is accomplished by vertical motion of a lifting means 100.

Referring to FIG. 4, the actuating ring 44 includes a first and second vertical wall 44A and 44B. The vertical walls are connected by a top wall 44C. Collectively, the three walls define an opening 150. A first and second groove 112 and 122 are located in vertical walls 44B and 44A, respectively. As illustrated in FIG. 6, each groove 112 and 122 is S-shaped providing for a total vertical lift of distance "A".

The lifting means 100 includes a head 100A which is attached to a lifting stem 100B (see FIG. 4). The sides of the lifting head 100A have a concave portion 101 to accommodate cam followers 110 and 120. Cam followers 110 and 120 are also supported within grooves 112 and 122, respectively. The stem 100B depends from the head 100A downwardly through a laterally restraining portion 33 of the housing 32. The stem 100B includes an orienting key 102. The orienting key is attached to the stem and contacts the lateral restraining portion 33. The key serves to prevent the rotation of the stem 100B as the actuating ring 44 is rotated relative to the lifting head 100A.

The lifting stem is in turn connected to a locking device 300 (illustrated in FIG. 4 by Vetco's H/4 connector, see composite catalog of *Oil Field Equipment and Services*, Vol. 3, Page 6842, published by World Oil, 1978-79 Ed.). Locking device 300 includes a ring 300A attached to the bottom of stem 100B and having a tapered inner surface 300C. The housing 32 also includes an inner ring 300E having a plurality of gripping segments 300G depending downwardly. Segments 300G have gripping surfaces 300B and a tapered exterior surface 300D to contact tapered inner surface 300C. The locking device 300 as illustrated in FIG. 4 is merely one type of assembly that can be used to connect members 12 and 14. It is obvious to one skilled in the art that any type of connecting assembly such as a linkage assembly, a toggle assembly, gripping dogs, collets, or the like which would permit a connection having a high preload, forced-transmitting capability can be substituted for the locking device 300.

The remaining portions of the alternate embodiment are substantially the same as the preferred embodiment. That is, the actuating ring 44 is supported within the housing 32 by ball bearings 46 and 48 seated within raceways in upper member 12 and housing 32, respectively, and in actuating ring 44. The actuating ring 44 includes a tooth-ridged rack 64 engaging a bevelled pinion 66. The pinion 66 is in turn connected to a rotating shaft 68 which extends through bearings within the housing 32.

In operation, the shaft 68 and pinion 66 are rotated manually or driven by a hydraulic or electric motor (not shown) which in turn, rotates rack 64 and the actuating ring. To advance the lifting means 100 upwardly, actuating ring 44 is rotated in a counterclockwise direction, as shown in FIG. 5. With such a rotation of the actuating ring 44, the cams 110 and 120 advance upwardly within the grooves 112 and 122, lifting the head 100A and stem 100B from a position Y to a position Z (see FIG. 6). Upward vertical movement of the stem 100B also causes upward movement of the locking device ring 300A. Such upward movement results in contact between surfaces 300C and 300D. Further vertical movement of stem 100B horizontally displaced gripping segments 300G which results in the engagement of toothed gripping surfaces 300B with matching toothed surfaces 300F on lower member 14. Conversely, clockwise movement of actuating ring 44 will cause cams 110 and 120 to advance downwardly within grooves 112 and 122 lowering head 100A and stem 100B from a position Z to a position Y. This downward movement results in disengagement of the toothed gripping surfaces 300B and 300F. Following such disengagement, lower member 14 may be removed from the housing 32.

Both of the above embodiments include passages 22 and 40 which permit the chamber 38 to be filled and flushed with oil or a corrosion inhibiting solution. Since the housing 32 sealably engages the upper and lower members 12 and 14, an oil or corrosion inhibiting solution will not leak out of the chamber 38. As briefly mentioned above, a pressure relief valve 42 and a check valve 23 are provided at the end of the exhaust passage 40 and inlet passage 22, respectively. The purpose of these valves is to prevent the accidental buildup of pressure within the chamber 38 which could damage the clamping assembly and/or prevent a proper connection. The rating of valve 42 is selected so as to limit the pressure within the chamber 38.

The present invention provides a clamping mechanism which permits a high, preload connection of an upper and lower member. The embodiments illustrate the use of an actuating ring in combination with a cam arrangement to provide either horizontal or vertical displacement to a locking device for connecting and preloading the connection.

Inasmuch as the present invention is subject to many variations, modifications and changes in detail, it is intended that all subject matter discussed above or shown in the accompanying drawings be interpreted as illustrative and not in a limiting sense. In addition, it is intended that all such equivalent modifications and variations fall within the spirit and scope of the present invention as claimed.

What is claimed is:

1. A clamping mechanism for connecting two members in end-to-end relation comprising:

a first member having a load receiving shoulder;

a second member having a housing attached to and circumscribing one end of said second member and receiving and first member therein;

rotatable actuating means having ball bearing means and an actuating ring supported within said housing by said ball bearing means, said actuating ring having a positioning cam groove and a loading cam groove formed therein; and a pivotable toggle assembly including a plurality of circumferentially spaced first toggle links each having a load surface, cam follower means attached to said first toggle links and contacting said positioning and load cam grooves to support said first toggle links within said actuating ring, and a plurality of spaced second toggle links having means pivotally connecting said second toggle links at one end to said first toggle links and at the other end to said housing, wherein said positioning cam groove radially displaces said first toggle links inwardly upon rotation of said actuating ring in a first direction to position said load surface adjacent to said load receiving shoulder and said loading cam groove radially displaces said pivotable connection between said first and second toggle links inwardly upon further rotation of said actuating ring in said first direction to force said load surface into engagement with said load receiving shoulder to preload said first and second members, and wherein rotation of said actuating ring in a direction opposite from said first direction radially displaces said load surface outwardly relative to said load receiving shoulder disengaging and unloading said first and second members.

2. A clamping mechanism as recited in claim 1 wherein said actuating ring includes an annular opening with said positioning cam grooves disposed on one side of said opening, said loading cam grooves disposed on an opposite side of said opening and said first toggle links disposed in said opening.

3. A clamping mechanism as recited in claim 2 and further comprising gear drive means extending through said housing means and engaging said actuating ring to selectively rotate said actuating ring.

4. A clamping mechanism as recited in claim 3 wherein said actuating ring carries a rack and said gear drive means includes a pinion engaging said rack and a gear reduction unit driving said pinion.

5. A clamping mechanism as recited in claim 1 wherein said actuating means further comprises drive means extending through said housing means and engaging said actuating ring to selectively rotate said actuating ring.

6. A clamping mechanism as recited in claim 5 wherein said actuating ring carries a rack and said drive means includes a pinion engaging said rack and a gear reduction unit driving said pinion.

* * * * *